(12) United States Patent
Corcoran et al.

(10) Patent No.: US 7,598,844 B2
(45) Date of Patent: Oct. 6, 2009

(54) POWER LINE COMMUNICATIONS MODULE AND METHOD

(75) Inventors: Kevin F. Corcoran, Middletown, MD (US); James D. Mollenkopf, Fairfax, VA (US); Terry L. Bernstein, Middletown, MD (US)

(73) Assignee: Current Technologies, LLC, Germantown, MD (US)

( * ) Notice: Subject to any disclaimer, the term of this patent is extended or adjusted under 35 U.S.C. 154(b) by 0 days.

(21) Appl. No.: 11/750,058

(22) Filed: May 17, 2007

(65) Prior Publication Data

US 2007/0211888 A1 Sep. 13, 2007

Related U.S. Application Data

(63) Continuation of application No. 11/341,646, filed on Jan. 30, 2006.

(51) Int. Cl.
*G05B 11/01* (2006.01)
(52) U.S. Cl. .............................. 340/310.11; 340/31.16; 709/223
(58) Field of Classification Search ................. 709/223; 340/310.11, 31.16
See application file for complete search history.

(56) References Cited

U.S. PATENT DOCUMENTS

| | | | |
|---|---|---|---|
| 3,445,814 A | 5/1969 | Spalti | |
| 3,656,112 A | 4/1972 | Paull | |
| 3,900,842 A | 8/1975 | Calabro et al. | |
| 3,911,415 A | 10/1975 | Whyte | |
| 3,942,168 A | 3/1976 | Whyte | |
| 3,942,170 A | 3/1976 | Whyte | |
| 3,944,723 A | 3/1976 | Fong | |
| 3,967,264 A | 6/1976 | Whyte et al. | |
| 3,973,087 A | 8/1976 | Fong | |

(Continued)

FOREIGN PATENT DOCUMENTS

DE 100 61 584 A1 6/2002

(Continued)

OTHER PUBLICATIONS

"Archnet: Automatic Meter Reading System Power Line Carrier Communication", www.archnetco.com/english/product/product_sl.htm, (2001).

(Continued)

*Primary Examiner*—Timothy Edwards, Jr.
(74) *Attorney, Agent, or Firm*—Mel Barnes; Capital Legal Group, LLC

(57) ABSTRACT

A system, device and method for providing communications to a plurality of customer premises via one or more external low voltage power lines is provided. One embodiment of the system includes a power line communication device comprising a first modem configured to communicate over the one or more external low voltage power lines. The system further includes a plurality of wireless interface devices, each located at, and external to, a respective one of the plurality of customer premises. Each wireless interface device may includes a first communication module configured to communicate with the power line communication device via the external low voltage power line; and a second communication module in communication with the first communication module and configured to provide wireless communications for one or more remote devices within the respective customer premises.

48 Claims, 5 Drawing Sheets

U.S. PATENT DOCUMENTS

| | | | |
|---|---|---|---|
| 3,973,240 A | 8/1976 | Fong | |
| 3,980,954 A | 9/1976 | Whyte | |
| 4,004,110 A | 1/1977 | Whyte | |
| 4,119,948 A | 10/1978 | Ward | |
| 4,199,761 A | 4/1980 | Whyte et al. | |
| 4,250,489 A | 2/1981 | Dudash et al. | |
| 4,442,492 A | 4/1984 | Karlsson et al. | |
| 4,475,209 A | 10/1984 | Udren | |
| 4,599,598 A | 7/1986 | Komoda et al. | |
| 4,638,298 A | 1/1987 | Spiro | |
| 4,642,607 A | 2/1987 | Strom et al. | |
| 4,652,855 A | 3/1987 | Weikel | |
| 4,701,945 A | 10/1987 | Pedigo | |
| 5,056,107 A | 10/1991 | Johnson et al. | |
| 5,426,360 A | 6/1995 | Maraio et al. | |
| 5,448,229 A | 9/1995 | Lee, Jr. | |
| 5,481,249 A | 1/1996 | Sato | |
| 5,572,438 A * | 11/1996 | Ehlers et al. | 700/295 |
| 5,696,501 A | 12/1997 | Ouellette et al. | |
| 5,726,980 A | 3/1998 | Rickard | |
| 5,748,104 A | 5/1998 | Argyroudis et al. | |
| 5,801,643 A | 9/1998 | Williams et al. | |
| 5,805,458 A | 9/1998 | McNamara et al. | |
| 5,818,821 A | 10/1998 | Schurig | |
| 5,870,016 A | 2/1999 | Shrestha | |
| 5,880,677 A | 3/1999 | Lestician | |
| 5,892,758 A | 4/1999 | Argyroudis | |
| 5,949,327 A | 9/1999 | Brown | |
| 5,978,371 A | 11/1999 | Mason, Jr. et al. | |
| 5,994,998 A | 11/1999 | Fisher et al. | |
| 6,130,896 A | 10/2000 | Lueker et al. | |
| 6,140,911 A | 10/2000 | Fisher et al. | |
| 6,150,955 A | 11/2000 | Tracy et al. | |
| 6,151,330 A | 11/2000 | Liberman | |
| 6,175,860 B1 | 1/2001 | Gaucher | |
| 6,239,722 B1 | 5/2001 | Colton et al. | |
| 6,243,413 B1 | 6/2001 | Beukema | |
| 6,243,571 B1 | 6/2001 | Bullock et al. | |
| 6,246,677 B1 | 6/2001 | Nap et al. | |
| 6,255,805 B1 | 7/2001 | Papalia et al. | |
| 6,262,672 B1 | 7/2001 | Brooksby et al. | |
| 6,346,875 B1 | 2/2002 | Puckette et al. | |
| 6,373,377 B1 | 4/2002 | Sacca et al. | |
| 6,373,399 B1 | 4/2002 | Johnson et al. | |
| 6,441,723 B1 | 8/2002 | Mansfield, Jr. et al. | |
| 6,459,998 B1 | 10/2002 | Hoffman | |
| 6,480,510 B1 | 11/2002 | Binder | |
| 6,504,357 B1 | 1/2003 | Hemminger et al. | |
| 6,522,650 B1 | 2/2003 | Yonge, III et al. | |
| 6,538,577 B1 | 3/2003 | Ehrke et al. | |
| 6,611,134 B2 | 8/2003 | Chung | |
| 6,618,709 B1 | 9/2003 | Sneeringer | |
| 6,624,532 B1 | 9/2003 | Davidow | |
| 6,650,249 B2 | 11/2003 | Meyer et al. | |
| 6,684,245 B1 | 1/2004 | Shuey et al. | |
| 6,687,574 B2 | 2/2004 | Pietrowicz et al. | |
| 6,710,721 B1 | 3/2004 | Holowick | |
| 6,737,984 B1 | 5/2004 | Welles et al. | |
| 6,778,099 B1 | 8/2004 | Meyer et al. | |
| 6,778,817 B1 | 8/2004 | Bullock et al. | |
| 6,842,459 B1 | 1/2005 | Binder | |
| 6,885,674 B2 | 4/2005 | Hunt et al. | |
| 6,954,814 B1 | 10/2005 | Leach | |
| 6,965,303 B2 | 11/2005 | Mollenkopf | |
| 6,977,578 B2 | 12/2005 | Kline | |
| 6,980,090 B2 | 12/2005 | Mollenkopf | |
| 6,980,091 B2 | 12/2005 | White et al. | |
| 6,985,714 B2 | 1/2006 | Akiyama et al. | |
| 6,993,317 B2 | 1/2006 | Belsak, Jr. | |
| 6,998,962 B2 | 2/2006 | Cope et al. | |
| 7,042,351 B2 | 5/2006 | Kline | |
| 7,089,089 B2 | 8/2006 | Cumming et al. | |
| 7,113,134 B1 | 9/2006 | Berkman | |
| 7,218,219 B2 | 5/2007 | Kline | |
| 7,224,272 B2 | 5/2007 | White et al. | |
| 7,248,158 B2 | 7/2007 | Berkman et al. | |
| 7,269,403 B1 | 9/2007 | Miao | |
| 7,274,305 B1 | 9/2007 | Luttrell | |
| 7,308,103 B2 | 12/2007 | Corcoran et al. | |
| 2001/0010032 A1 | 7/2001 | Ehlers et al. | |
| 2001/0038343 A1 | 11/2001 | Meyer et al. | |
| 2002/0063635 A1 | 5/2002 | Shincovich | |
| 2002/0084914 A1 | 7/2002 | Jackson et al. | |
| 2002/0109585 A1 | 8/2002 | Sanderson | |
| 2003/0063723 A1 | 4/2003 | Booth et al. | |
| 2003/0100288 A1 | 5/2003 | Tomlinson, Jr. et al. | |
| 2003/0129978 A1 | 7/2003 | Akiyama et al. | |
| 2003/0133420 A1 | 7/2003 | Haddad | |
| 2003/0158677 A1 | 8/2003 | Swarztrauber et al. | |
| 2003/0224784 A1 | 12/2003 | Hunt et al. | |
| 2004/0047335 A1 | 3/2004 | Proctor, Jr. et al. | |
| 2004/0064276 A1 | 4/2004 | Villicana et al. | |
| 2004/0066283 A1 | 4/2004 | Manis et al. | |
| 2004/0067745 A1 | 4/2004 | Belsak | |
| 2004/0083066 A1 | 4/2004 | Hayes et al. | |
| 2004/0090312 A1 | 5/2004 | Manis et al. | |
| 2004/0110483 A1 | 6/2004 | Mollenkopf | |
| 2004/0135676 A1 | 7/2004 | Berkman et al. | |
| 2004/0157551 A1 | 8/2004 | Gainey et al. | |
| 2004/0163128 A1 | 8/2004 | Phillips et al. | |
| 2004/0168199 A1 | 8/2004 | Phillips et al. | |
| 2004/0176026 A1 | 9/2004 | Gainey et al. | |
| 2004/0198453 A1 | 10/2004 | Cutrer et al. | |
| 2004/0223470 A1 | 11/2004 | Smith | |
| 2004/0223617 A1 * | 11/2004 | Corcoran et al. | 380/266 |
| 2004/0227622 A1 | 11/2004 | Giannini et al. | |
| 2004/0239522 A1 | 12/2004 | Gallagher | |
| 2004/0242185 A1 | 12/2004 | Lee | |
| 2005/0033534 A1 | 2/2005 | Villicana et al. | |
| 2005/0040809 A1 | 2/2005 | Uber, III et al. | |
| 2005/0055432 A1 * | 3/2005 | Rodgers | 709/223 |
| 2005/0055729 A1 | 3/2005 | Atad et al. | |
| 2005/0068223 A1 | 3/2005 | Vavik | |
| 2005/0068915 A1 | 3/2005 | Atad et al. | |
| 2005/0076149 A1 | 4/2005 | McKown et al. | |
| 2005/0083206 A1 | 4/2005 | Couch et al. | |
| 2005/0085259 A1 | 4/2005 | Conner et al. | |
| 2005/0090995 A1 | 4/2005 | Sonderegger | |
| 2005/0111533 A1 | 5/2005 | Berkman et al. | |
| 2005/0129097 A1 | 6/2005 | Strumpf et al. | |
| 2005/0164666 A1 | 7/2005 | Lang et al. | |
| 2005/0168326 A1 | 8/2005 | White et al. | |
| 2005/0200459 A1 | 9/2005 | White et al. | |
| 2005/0220004 A1 | 10/2005 | Vollmer et al. | |
| 2005/0226200 A1 | 10/2005 | Askildsen et al. | |
| 2005/0239400 A1 | 10/2005 | Narikawa | |
| 2005/0249245 A1 | 11/2005 | Hazani et al. | |
| 2005/0251401 A1 | 11/2005 | Shuey | |
| 2005/0259668 A1 | 11/2005 | Kim | |
| 2005/0273282 A1 | 12/2005 | Mollenkopf | |
| 2005/0285720 A1 | 12/2005 | Cope et al. | |
| 2006/0004679 A1 | 1/2006 | Cahill-O'Brien et al. | |
| 2006/0007016 A1 | 1/2006 | Borkowski et al. | |
| 2006/0031180 A1 | 2/2006 | Tamarkin et al. | |
| 2006/0036795 A1 | 2/2006 | Leach | |
| 2006/0044076 A1 | 3/2006 | Law | |
| 2006/0045105 A1 | 3/2006 | Dobosz et al. | |
| 2006/0066456 A1 | 3/2006 | Jonker et al. | |
| 2006/0071810 A1 | 4/2006 | Scoggins et al. | |
| 2006/0073805 A1 | 4/2006 | Zumkeller et al. | |
| 2006/0077906 A1 | 4/2006 | Maegawa et al. | |
| 2006/0079198 A1 | 4/2006 | Sanderson | |
| 2006/0091877 A1 | 5/2006 | Robinson et al. | |
| 2006/0097573 A1 | 5/2006 | Gidge et al. | |

| | | | | | | |
|---|---|---|---|---|---|---|
| 2006/0106554 | A1 | 5/2006 | Borkowski et al. | GB | 2 293 950 A | 4/1996 |
| 2006/0132299 | A1 | 6/2006 | Mansfield et al. | JP | 10200544 A2 | 7/1998 |
| 2006/0140260 | A1 | 6/2006 | Wasaki et al. | WO | WO-99/59261 A1 | 11/1999 |
| 2006/0145834 | A1 | 7/2006 | Berkman et al. | WO | WO-03/030396 A2 | 4/2003 |
| 2006/0184288 | A1 | 8/2006 | Rodgers | WO | WO-03/039022 A1 | 5/2003 |
| 2006/0220833 | A1* | 10/2006 | Berkman ............... 340/538.16 | WO | WO 2004102868 | 11/2004 |
| 2006/0221995 | A1 | 10/2006 | Berkman | | | |
| 2006/0286927 | A1 | 12/2006 | Berkman | | | |
| 2006/0291546 | A1 | 12/2006 | Zitting | | | |
| 2006/0291575 | A1 | 12/2006 | Berkman et al. | | | |
| 2007/0001821 | A1 | 1/2007 | Berkman | | | |
| 2007/0002772 | A1 | 1/2007 | Berkman et al. | | | |
| 2007/0002876 | A1 | 1/2007 | Berkman et al. | | | |
| 2007/0054622 | A1 | 3/2007 | Berkman | | | |
| 2007/0165835 | A1 | 7/2007 | Berkman | | | |
| 2007/0173202 | A1 | 7/2007 | Binder et al. | | | |
| 2007/0201494 | A1 | 8/2007 | Lou et al. | | | |
| 2007/0236340 | A1 | 10/2007 | White, II | | | |
| 2007/0287406 | A1 | 12/2007 | Kline | | | |
| 2008/0012724 | A1 | 1/2008 | Corcoran | | | |
| 2008/0018491 | A1 | 1/2008 | Berkman et al. | | | |
| 2008/0037784 | A1 | 2/2008 | Corcoran et al. | | | |

FOREIGN PATENT DOCUMENTS

| | | | |
|---|---|---|---|
| DE | 100 61 586 | A1 | 6/2002 |
| EP | 0 581 351 | A1 | 2/1994 |
| EP | 1 251 646 | A2 | 10/2002 |

OTHER PUBLICATIONS

"EMETCON Automated Distribution System", *ABB Power T & D Company, Inc*, (Jan. 1990), 1-14.

"EMETCON Automated Distribution System: Communications Guide", *Westinghouse ABB Power T & D Company Technical Manual 42-6001A,*, (Sep. 1989), 1-55.

Lokken, G et al., "The Proposed Wisconsin Eectric Power Company Load Management System Using Power Line Carrier Over Distribution Lines", *1976 National Telecommunications Conference, IEEE*. (1976),2.2-12.2-3.

Russell, B D., "Communication Alternatives for Distribution Metering and Load Management", *IEEE Transactions on Power Apparatus and Systems*, (1980), 1448-1455.

"Outlook Conference 2004: Amperion Deployment Overview", *Primen Conference*, (May 7, 2004), 1-10.

Jee, G et al., "Demonstration of the Technical Viability of PLC Systems on Medium- and Low-Voltage Lines in the United States", *IEEE Communication Magazine*, (May 2003), 108-112.

\* cited by examiner

POWER LINE COMMUNICATIONS MODULE AND METHOD

CROSS REFERENCE TO RELATED APPLICATIONS

This application is a continuation of, and claims priority to, U.S. patent application Ser. No. 11/341,646 filed Jan. 30, 2006, which is incorporated herein by reference in its entirety.

FIELD OF THE INVENTION

The present invention generally relates to data communications over a power distribution system and more particularly, to a communications module for communicating utility meter data and power line communications data.

BACKGROUND OF THE INVENTION

Well-established power distribution systems exist throughout most of the United States, and other countries, which provide power to customers via power lines. With some modification, the infrastructure of the existing power distribution systems can be used to provide data communication in addition to power delivery, thereby forming a power line communication system (PLCS). In other words, existing power lines that already have been run to many homes and offices, can be used to carry data signals to and from the homes and offices. These data signals are communicated on and off the power lines at various points in the power line communication system, such as, for example, near homes, offices, Internet service providers, and the like.

There are many challenges to overcome in order to use power lines for data communication. Power lines are not designed to provide high speed data communications and can be very susceptible to interference. Additionally, federal regulations limit the amount of radiated energy of a power line communication system, which therefore limits the strength of the data signal that can be injected onto power lines (especially overhead power lines). Consequently, due to the attenuation of power lines, communications signals typically will travel only a relatively short distance on power lines. In addition, the distance may vary from location to location.

Power line communication systems often communicate with user devices in the customer premises, which typically are coupled directly or indirectly to an internal low voltage (LV) power line network. This communication typically involves transmitting signals along the external LV power lines, through an electric meter, and along the internal LV power lines to the user device. However, the electric meter, which measures the power consumed by the customer premises and is connected to the LV power lines, sometimes attenuates the data signals. Additionally, in some instances the length of the LV power lines and associated attenuation can hamper or prevent reliable communications. Additionally, ingress noise and noise from home appliances can degrade communications performance.

Automated meter reading (AMR) has been investigated as a means for reducing the cost of reading meters. The high capital cost of replacing meters and building an AMR system in a large geographical area has hindered wide scale adoption of automated meter reading.

Thus, there is a need for a communications module and method that facilitates automated electric meter reading and reliable communication of user data signals that can be dynamically configured and reconfigured by a network management system. These and other advantages may be provided by various embodiments of the present invention.

SUMMARY OF THE INVENTION

The present invention provides a system, device and method for providing communications to a plurality of customer premises via one or more external low voltage power lines. One embodiment of the system includes a power line communication device comprising a first modem configured to communicate over the one or more external low voltage power lines. The system further includes a plurality of wireless interface devices, each located at, and external to, a respective one of the plurality of customer premises. Each wireless interface device may includes a first communication module configured to communicate with the power line communication device via the external low voltage power line; and a second communication module in communication with the first communication module and configured to provide wireless communications for one or more remote devices within the respective customer premises.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings.

DETAILED DESCRIPTION OF ILLUSTRATIVE EMBODIMENTS

In the following description, for purposes of explanation and not limitation, specific details are set forth, such as particular networks, communication systems, computers, terminals, devices, components, techniques, PLCS, data and network protocols, software products and systems, operating systems, development interfaces, hardware, etc. in order to provide a thorough understanding of the present invention.

However, it will be apparent to one skilled in the art that the present invention may be practiced in other embodiments that depart from these specific details. Detailed descriptions of well-known networks, communication systems, computers, PLCS, terminals, devices, components, techniques, data and network protocols, software products and systems, operating systems, development interfaces, and hardware are omitted so as not to obscure the description of the present invention.

Figure 1:
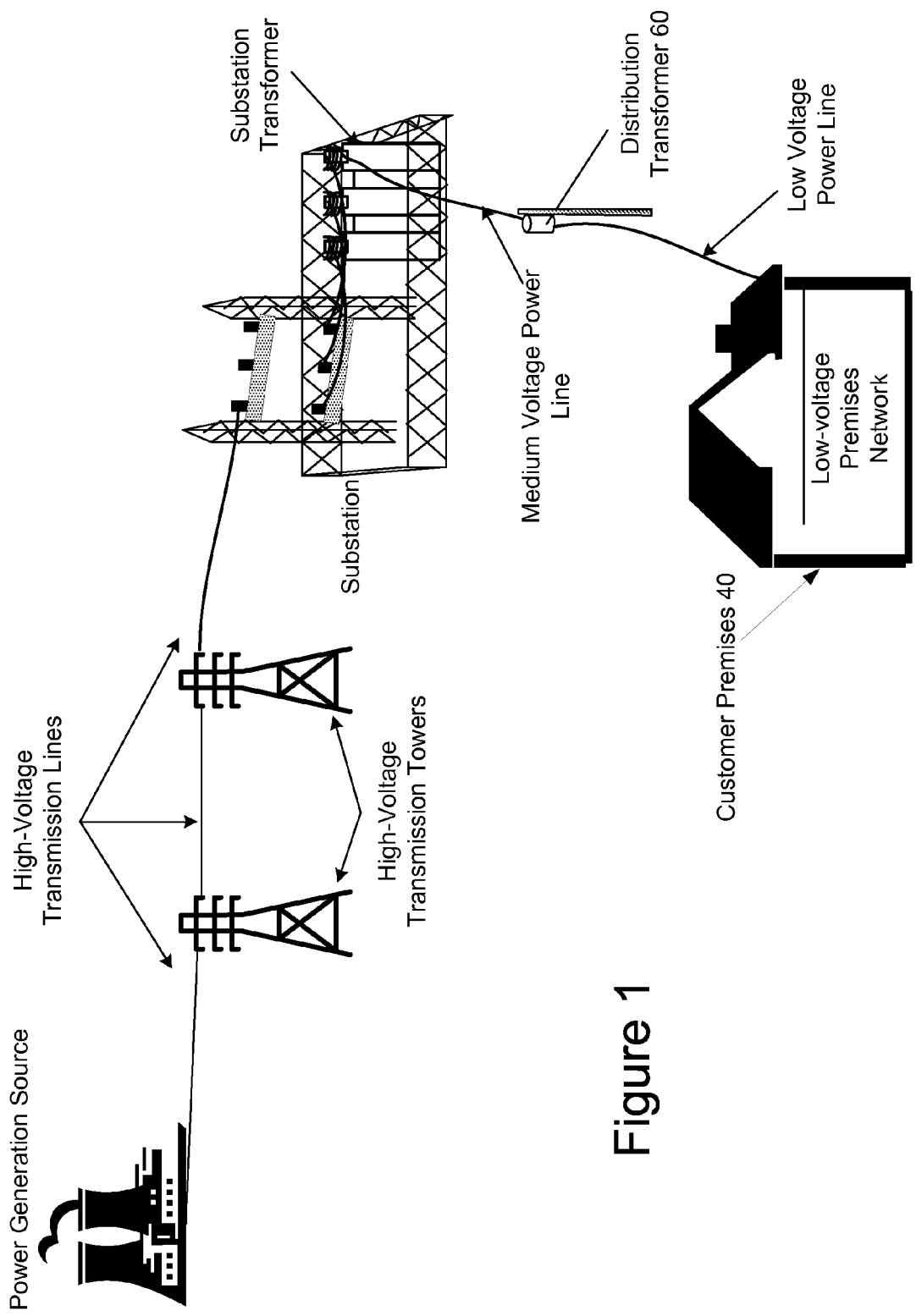
FIG. 1 is a diagram of an exemplary power distribution system with which the present invention may be employed.

As shown in FIG. 1, power distribution systems typically include components for power generation, power transmission, and power delivery. A transmission substation typically is used to increase the voltage from the power generation source to high voltage (HV) levels for long distance transmission on HV transmission lines to a substation. Typical voltages found on HV transmission lines range from 69 kilovolts (kV) to in excess of 800 kV.

In addition to HV transmission lines, power distribution systems include MV power lines and LV power lines. MV typically ranges from about 1000 V to about 100 kV and LV typically ranges from about 100 V to about 800 V. Transformers are used to convert between the respective voltage portions, e.g., between the HV section and the MV section and between the MV section and the LV section. Transformers have a primary side for connection to a first voltage (e.g., the MV section) and a secondary side for outputting another (usually lower) voltage (e.g., the LV section). Transformers used between the MV section and the LV section are often referred to as distribution transformers or as step down transformers, because they "step down" the voltage to some lower voltage. Transformers, therefore, provide voltage conversion for the power distribution system. Thus, power is carried from substation transformer to a distribution transformer over one or more MV power lines. Power is carried from the distribution transformer to the customer premises via one or more LV power lines.

In addition, a distribution transformer may function to distribute one, two, or three, phase voltages to the customer premises, depending upon the demands of the user. In the United States, for example, these local distribution transformers typically feed anywhere from one to ten homes, depending upon the concentration of the customer premises in a particular area. Distribution transformers may be pole-top transformers located on a utility pole, pad-mounted Underground Residential Distribution (URD) transformers located on the ground, or transformers located under ground level.

Figure 2:
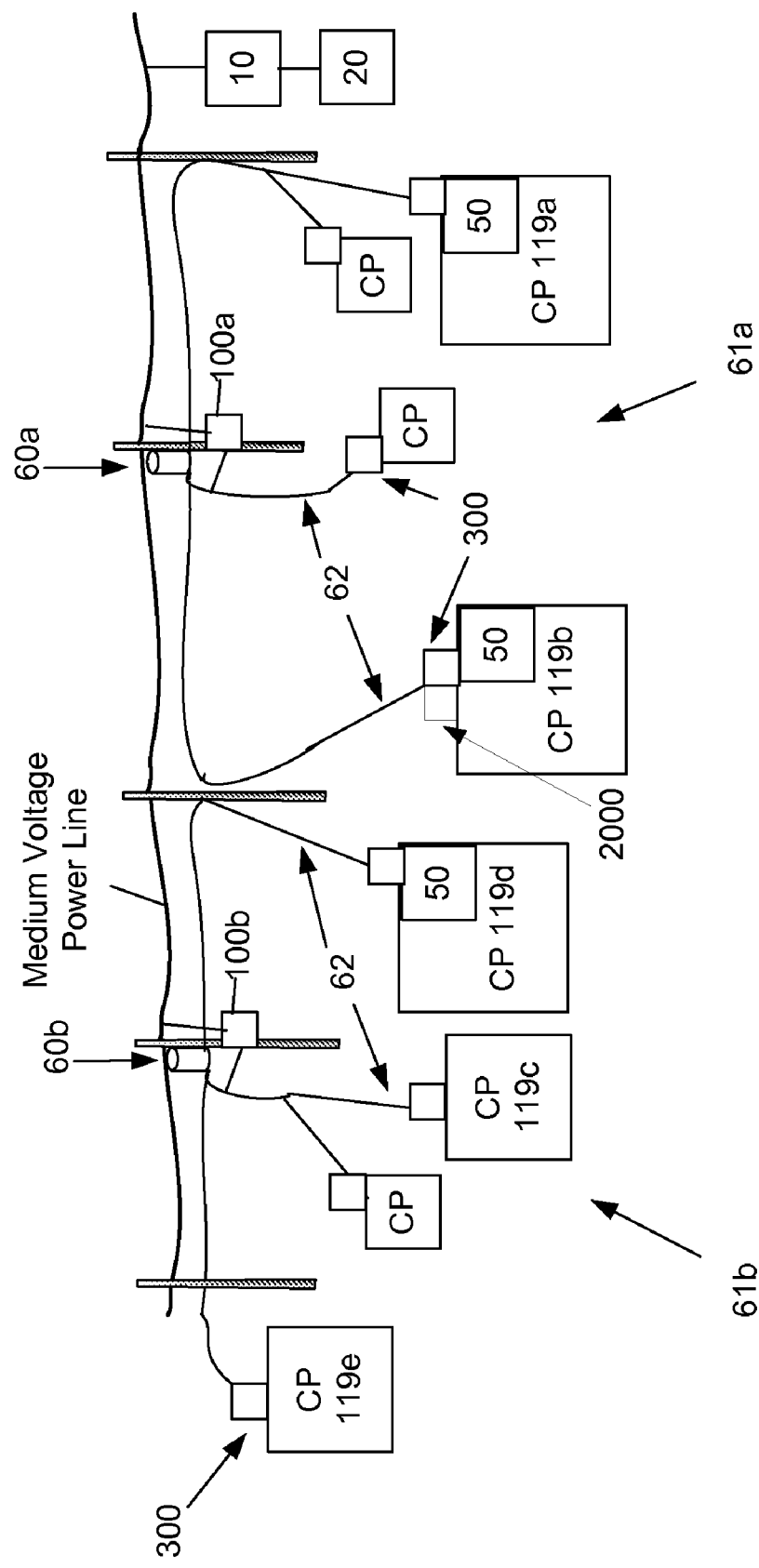
FIG. 2 is a diagram of a portion of an example power line communications system.

One example of a portion of a conventional PLCS is shown in FIG. 2. In this example, two bypass devices (BD) 100a and 100b are used to communicate data signals around the distribution transformers that would otherwise filter such data signals, preventing them from passing through the transformer or significantly degrading them. Thus, the BD 100 is the gateway between the LV power line subnet (i.e., the LV power line connected to the distribution transformer and the devices that are coupled to the LV power lines) and the MV power line and communicates signals to and from user devices at the customer premises (CP) of the low voltage subnet 61.

In this example embodiment, the BD 100 provides communication services for the user, which may include security management, routing of Internet Protocol (IP) packets, filtering data, access control, service level monitoring, signal processing and modulation/demodulation of signals transmitted over the power lines.

This example portion of a PLCS also includes a backhaul point 10. The backhaul point 10 is an interface and gateway between a portion of a PLCS (e.g., an MV run) and a traditional non-power line telecommunications network. One or more backhaul points (BP) 10 may be communicatively coupled to an aggregation point (AP) 20 that in many embodiments may be at (e.g., co-located with), or connected to, the point of presence to the Internet. The BP 10 may be connected to the AP 20 using any available mechanism, including fiber optic conductors, T-carrier, Synchronous Optical Network (SONET), or wireless techniques well known to those skilled in the art. Thus, the BP 10 may include a transceiver suited for communicating through the communication medium that comprises the backhaul link.

The PLCS also may include a power line server (PLS) that is a computer system with memory for storing a database of information about the PLCS and includes a network element manager (NEM) that monitors and controls the PLCS. The PLS allows network operations personnel to provision users and network equipment, manage customer data, and monitor system status, performance and usage. The PLS may reside at a remote network operations center (NOC), and/or at a PLCS Point of Presence (POP), to oversee a group of communication devices via the Internet. The PLS may provide an Internet identity to the network devices by assigning the devices (e.g., user devices, BDs 100, (e.g., the LV modems and MV modems of BDs), BPs 10, and AP 20) IP addresses and storing the IP addresses and other device identifying information (e.g., the device's location, address, serial number, etc.) in its memory. In addition, the PLS may approve or deny user devices authorization requests, command status reports, statistics and measurements from the BDs, and BPs, and provide application software upgrades to the communication devices (e.g., BDs, BPs, and other devices). The PLS, by collecting electric power distribution information and interfacing with utilities' back-end computer systems may provide enhanced power distribution services such as automated meter reading, outage detection, restoration detection, load balancing, distribution automation, Volt/Volt-Amp Reactance (Volt/VAr) management, and other similar functions. The PLS also may be connected to one or more APs and/or core routers directly or through the Internet and therefore can communicate with any of the BDs, user devices, and BPs through the respective AP and/or core router.

The PLCS may further include indoor low voltage repeaters and outdoor low voltage repeaters. Indoor low voltage repeaters may be plugged into a wall socket inside the customer premises. Outdoor low voltage repeaters may be coupled to the external low voltage power line conductors extending from the transformer and therefore, be located between the customer premises and the BD 100. Both the indoor low voltage repeaters and outdoor low voltage repeaters repeat data on the low voltage power line to extend the communication range of the BD 100 and power line modem.

At the user end of the PLCS of this example system, data flow originates from a user device, which provides the data to a power line modem (PLM) 50, which is well-known in the art.

The user device connected to the PLM 50 may be any device capable of supplying data for transmission (or for receiving such data) including, but not limited to a computer, a telephone, a telephone answering machine, a fax, a digital cable box (e.g., for processing digital audio and video, which may then be supplied to a conventional television and for transmitting requests for video programming), a video game, a stereo, a videophone, a television (which may be a digital television), a video recording device (which may be a digital video recorder), a home network device, a direct load control switch, utility distribution automation equipment, or other device. The PLM 50 transmits the data received from the user device through the LV power lines to a BD 100 and provides data received from the LV power line to the user device. The PLM 50 may also be integrated with the user device, which may be a computer. In addition and as discussed herein, the functions of the PLM may be integrated into a smart utility meter such as a gas meter, electric meter, water meter, or other utility meter to thereby provide automated meter reading (AMR).

The BD 100 typically receives data from the user devices coupled to its LV power line subnet and then transmits the data to (and receives the data from) the backhaul point 10, which, in turn, transmits the data to (and receives the data from) the AP 20. The AP 20 then transmits the data to (and receives the data from) the appropriate destination (perhaps via a core router), which may be a network destination (such as an Internet address) in which case the packets are transmitted to, and pass through, numerous routers (herein routers are meant to include both network routers and switches) in order to arrive at the desired destination. A detailed description of an example PLCS, its components and features is provided in U.S. patent application Ser. No. 11/091,677 filed Mar. 28, 2005issued as U.S. Pat. No. 7,224,272, entitled "Power Line Repeater System and Method," which is hereby incorporated by reference in its entirety. A detailed description of another example PLCS, its components and features is provided in U.S. patent application Ser. No. 10/973,493 filed Oct. 26, 2004, issued as U.S. Pat. No 7,321,291, entitled "Power Line Communications System and Method of Operating the Same," which is hereby incorporated by reference in its entirety. The present invention may be used with networks as described in the above patent applications or others. Thus, the invention is not limited to a particular PLCS, PLCS architecture, or topology.

Referring to FIG. 2, one example PLCS includes a BD 100 at each distribution transformers 60a and 60b to service the user devices coupled to the respective LV power line subnet. Thus, BD 100a is coupled to backhaul point 10 via the MV power line and also coupled to LV power line subnet 61a to provide communications to the user devices coupled thereto. In this example, LV power line subnet 61a includes the LV power lines connected to distribution transformer 60a, which may be connected to between one and ten (and sometimes more) customer premises (CP). One or more of the customer premises may include one or more power line modems 50 and associated user devices that are connected to the internal power lines such as, for example, at CP 119a and 119b.

Similarly, BD 100b is coupled to backhaul point 10 via the MV power line and also coupled to LV power line subnet 61b to provide communications to the user devices coupled thereto. In this example, LV power line subnet 61b includes the LV power lines coupled to distribution transformer 60b. One or more of the customer premises receiving power via LV power line subnet 61b may include one or more PLMs 50 and the associated user devices connected thereto such as, for example, at CP 119c, 119d, and 119e. Thus, as shown in FIG. 2, the bypass device 100 typically communicates via the external low voltage power lines 62, the power meter 300, and internal power lines to the user device. In some instances however, the electric meter and the length of the low voltage power lines (both internal and external) may attenuate the data signals to the point where communications are prevented or degraded and/or are no longer reliable.

Figure 3:
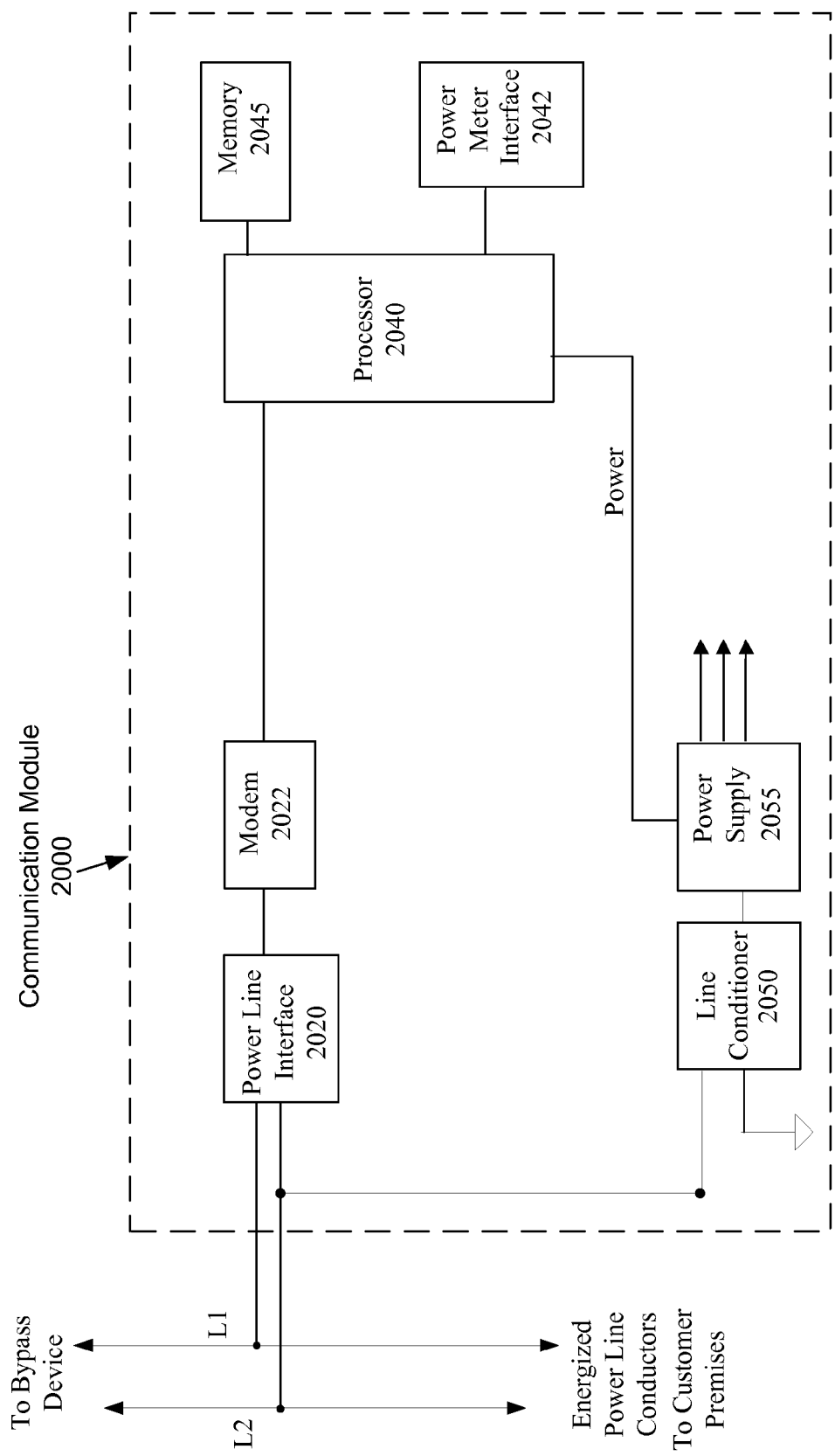
FIG. 3 is a diagram of an example embodiment of a communication module according to the present invention.

FIG. 3 depicts an example communications module 2000 that provides repeating of some power line communication data (user data) and facilitates automated reading of the power meter 300. In other implementations, the module 2000 may facilitate automated reading of additional or other meters such as gas meters and/or water meters. This example embodiment may be integrated into or form part of the power meter. In one example embodiment, the module 2000 may be implemented on a circuit card that is inserted into an electronic meter. In other embodiments, all or part of the module 2000 may be disposed in the meter collar.

This example embodiment includes a power line interface 2020 which is coupled to modem 2022. Power line interface 2020 may include impedance matching circuitry, a band filter, an amplifier, power signal isolation circuitry, transmit and receive circuitry, and other conditioning circuitry. As shown, power line interface 2020 may be coupled to both energized conductors L1 and L2 and may transmit data by differentially coupling the data signals onto the power line conductors (e.g., via a transformer therein) and similarly receiving the data. In addition, the power line interface 2020 may provide frequency translation. While this embodiment communicates over two energized power line conductors, other embodiments may communicate over one energized conductor or three energized conductors (three phase service).

The modem 2022 may be a HomePlug compliant or compatible power line modem (e.g., substantially comply or compatible with HomePlug 1.0, Turbo, or AV) and employ OFDM for communications over the power line. The modem 2022 is communicatively coupled to the processor 2040. The processor 2040 may be in communication with memory 2045, which may include volatile and non-volatile random access memory (RAM) which may be used to store utility metrology data, including power usage data, collected from the meter 300 and program code to be executed by the processor 2040. Other utility metrology data (or referred to herein as utility data) may include, but is not limited to Voltage (peak/average/threshold) data, Current (peak/average/threshold) data, power factor data, phase angle data, peak power data, average power data, voltage sag data, voltage swell data, neutral current, peak reverse power data, and average reverse power data. As will be evident to one skilled in the art, some of these data types may comprise raw measurements and others may be derived from raw measurement data. Additionally, one or more of these may cause the processor 2040 to generate (and transmit) an alert such as an Alert on detection of reverse power, voltage sag, voltage swell, voltage out of limit (too high or low), etc.

New program code may also be received via the energized conductors (e.g., the external power line conductors) from a network element, such as a bypass device, of the PLCS. The new code may then be stored in flash memory for execution by the processor 2040. The module 2000 may be configured by to enable or disable repeating of power line communications via a command from a network element, such as a bypass device, of the PLCS. The enabling or repeating of PLC data may thus be achieved by the processor 2040 executing program code and in response to receiving a command.

The processor 2040 may also be in communication with the meter via a power meter interface 2042 in order to receive data and perform other AMR processes. A power supply 2055 is coupled to the processor 2040, modem 2022, and other components to provide power thereto.

The utility data (e.g., power usage data) may be received by the module 2000 and transmitted via the LV power line to a power line communications system network element, which may be, for example, a transformer bypass device 100. The network element may then transmit the utility data (e.g., via the MV power line) to an upstream device (e.g., a backhaul device 10), which further transmits the utility data upstream for eventual reception by utility provider. Additionally, the module 2000 may receive user data from the bypass device 100 and transmit the data over the LV power line for reception by one or more user devices in the customer premises. Similarly, the module 2000 may receive user data from one or more user devices in the customer premises and transmit the user data over the LV power line to the bypass device 100 or other network element. Examples of such a power line communications systems and network elements are described in the applications incorporated above.

In operation, data signals will be received from the internal LV power line via line interface 2020. After conditioning by line interface 2020, the signals will be provided to modem 2022. However, if a data packet received by modem 2022 does not have a destination address (e.g., media access control address or IP address) that corresponds to modem 2022, the data packet may be ignored. In other instances, the data signals received by the modem 2022 may have been encrypted by the transmitting device. If the modem has the correct encryption key, the modem may successfully decrypt the data packets. However, if the modem 2022 does not have the correct encryption key, the modem 2022 will not be able to successfully decrypt the data packet and the data will be ignored. A first key may be used for communications between the module 2000 and user devices and a second key may be used for communications between the module 2000 and its network element (e.g., bypass device). The processor 2040 may control which keys modem 2022 uses. If the packet is not correctly addressed or encrypted, the data may be discarded and not repeated by module 2000. Other means of selectively repeating the data may also be employed.

There are various reasons for employing selective repeating and/or multiple encryption keys. As discussed above, if communications between the bypass device and the user device are not reliable, the user device may sometimes receive data from the bypass device. If the module 2000 is repeating all data packets, it is possible that the user device (or the bypass device) may receive the same packet twice (transmitted once from the module and once from the bypass device), which would likely cause an error. To prevent this occurrence, the bypass device and the user devices (i.e., their power line modems) may use different encryption keys for communications on the LV power line. This creates a logical isolation of the internal and external networks. Additionally, the bypass device may communicate with a plurality of user devices in different customer premises, which are electrically connected by the LV power lines. Using a different encryption key for each customer premises ensures that user devices in one customer premises cannot receive data transmitted by or to user devices in another customer premises. Additionally, it may be desirable to repeat user data to increase the signal strength of the user data, which may allow for increased data speed.

In an alternate example embodiment, LV power line communications with the bypass device and the user devices (i.e., their power line modems) may use different frequency bands. In this embodiment, the power line interface 2020 may include frequency translation circuitry for translation from the 4-21 MHz band to the 20-50 MHz band. Thus, in this embodiment, Homeplug compliant data signals (e.g., Homeplug 1.0, HomePlug Turbo, or Homeplug AV) between the module 2000 and user devices may use the 20-50 MHz band and communications between the module 2000 and the bypass device may use the 4-21 MHz (or vice versa). Thus, because they communicate in different frequency bands, the user devices and the bypass device cannot "accidentally" communicate with each other. In this embodiment, the power line interface may have two different input and output filters (one for each band) and two frequency translation circuits—one for upbanding the output of the modem to the higher frequency band and one for downbanding the input of the higher frequency to the modem's native frequency band. This embodiment may be implemented by having the processor 2040 control the frequency band at which the power line interface 2020 communicates. Alternately, if a modem that supported two frequency bands were used, processor 2040 may control the frequency used by modem 2022. The modem 2022 could also communicate via its native frequency or frequencies.

In the first embodiment, if repeating is enabled, and the data packet is successfully decrypted, the demodulated data packet is supplied to the processor 2040. Processor 2040 may process the data packet(s) and if the packet contains a command may perform one or more activities. Such commands and associated activities may include transmit utility data, update schedule of transmissions of utility data, disable repeating, enable repeating, receive and store new program code, store new IP address, and others. Processor 2040 may determine a data packet includes a command by any suitable method such as identify packets having a destination IP address corresponding to that of module 2000, which is stored in memory 2045. If the packet is not a command, the processor 2040 may supply the same received data packet back to the modem for transmission onto the LV conductors. In addition to supplying the data packet to the modem 2022, the processor 2040 also may supply information of the encryption key to be used to encrypt the data packet (or, in an alternate embodiment, information to control the frequency band of transmission). If repeating is disabled, the processor 2040 does not supply the packet back to the modem 2022 or alternately may disable the modem 2022. In an alternate embodiment, the data received by the processor 2040 from modem 2022 also may be re-addressed by processor 2040 with the destination address (e.g., MAC address) of the user device that corresponds to the destination address of the data packet. Thus, the processor 2040 may include router (or switch) functionality.

Figure 4:
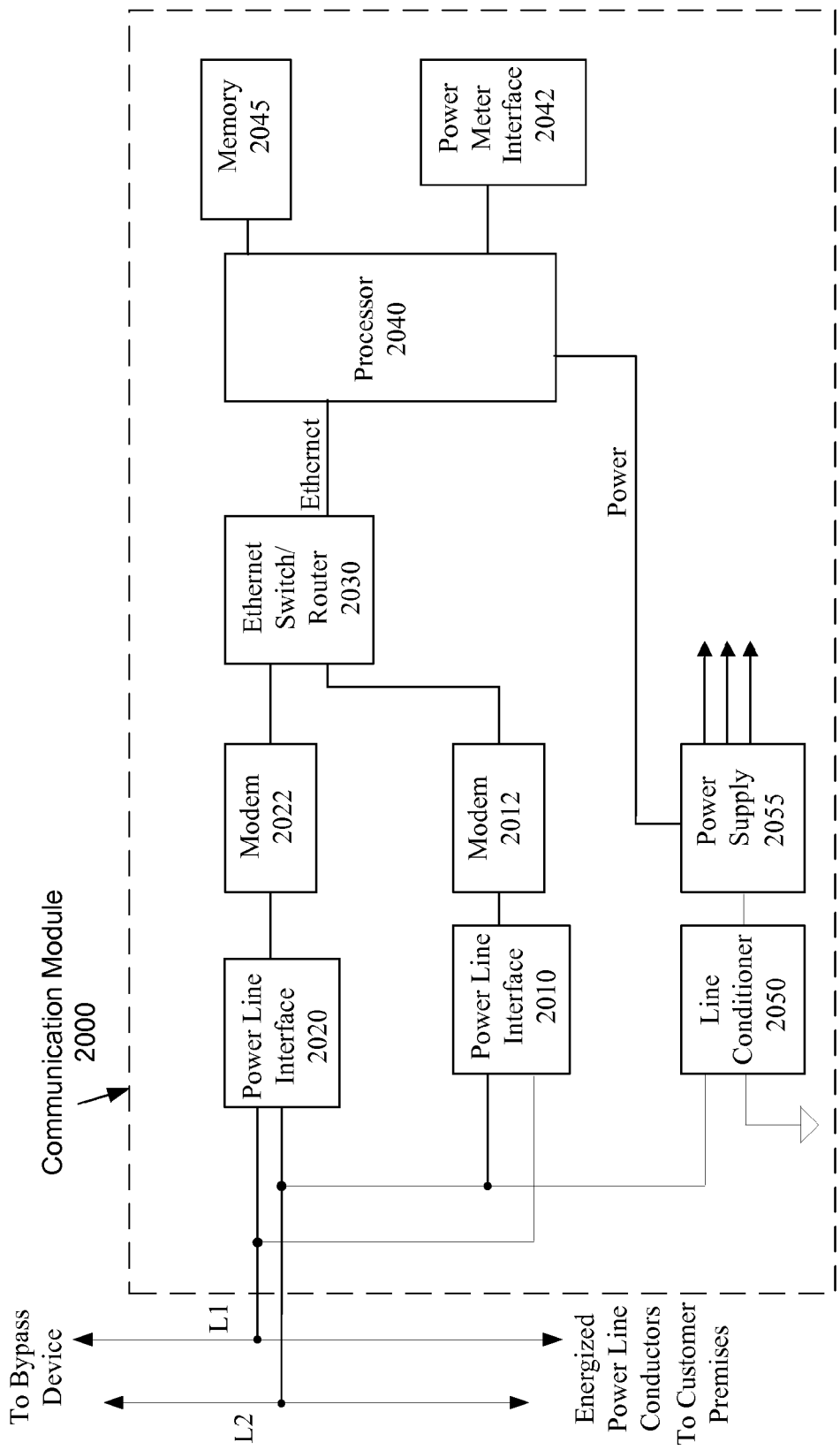
FIG. 4 is a block diagram of an example embodiment of a communication module, in accordance with the present invention.

FIG. 4 illustrates another example implementation of module 2000. This example embodiment, includes a first power line interface 2010 and a second power line interface 2020, which are in communication with a first modem 2012, and second modem 2022, respectively. Line interfaces 2010 and 2020 each may include a impedance matching circuitry, a band filter, an amplifier, power signal isolation circuitry, transmit and receive circuitry, and other conditioning circuitry. As shown, each line interface 2010 and 2020 may be coupled to both energized conductors and may transmit data by differentially coupling the data signals onto the power line (e.g., via a transformer therein). The modems 2012 and 2022 may be HomePlug compatible power line modems and employ OFDM for communications over the power line. Each modem is coupled to an Ethernet switch/router 2030, which is coupled to a processor 2040. The processor 2040 may be in communication with memory 2045, which may include volatile and non-volatile memory and used as discussed above. Further, the line condition 2050, power supply 2055, power meter interface 2042, and processor 2040 work substantially the same as described for the embodiment of FIG. 3. In an alternate embodiment, processor 2040 may be connected to modems 2012 and 2022 and performs the switch/router functions alleviating the need for a separate switch/router 2030 component.

Instead of a single modem (modem 2022 of FIG. 3) that communicates with multiple encryption keys, this embodiment includes two modems 2022 and 2012 and each modem may communicate using a different encryption key to perform the logical isolation of networks described above. Thus, modem 2022 may use the encryption key of, and may communicate only with, the bypass device 100. Similarly, modem 2012 may use the encryption key associated with power line modems of, and communicate only with, user devices in the home. Additionally, because the two modems use different encryption keys, they cannot communicate with each other. In addition, with numerous encryption keys this embodiment may ensure that devices in nearby customer premises (connected to the same LV power line) cannot communicate (receive or transmit) data with devices in the customer premises.

In a second embodiment, instead of using different encryption keys the two power line interface circuits 2010 and 2020 may be configured to receive and transmit in different frequency bands to perform the logical isolation of networks described above. In this embodiment, the power line interface 2020 may not include frequency translation and be configured to receive and transmit in the 4-21 MHz band. Power line interface 2010 may include two frequency translation circuits—one for upbanding the output of the modem to the higher frequency band (e.g., 30-50 MHz) and one for downbanding the input of the higher frequency to 4-21 MHz used by the modem. Alternatively, the modem itself may communicate on 4-21 or 30-50 as selected by Processor 2040. In still another embodiment, a natively upbanded modem chip may be used. Thus, one frequency may be used to communicate with user devices and the other for communicating with the bypass device.

In operation, the module 2000 works substantially the same as the embodiment of FIG. 3 except that data received by the processor 2040 from one modem (e.g., 2012) will be supplied to the other modem (e.g. 2022) for transmission, if repeating is enabled. This process is accomplished via Ethernet switch/router 2030. or processor.

Figure 5:
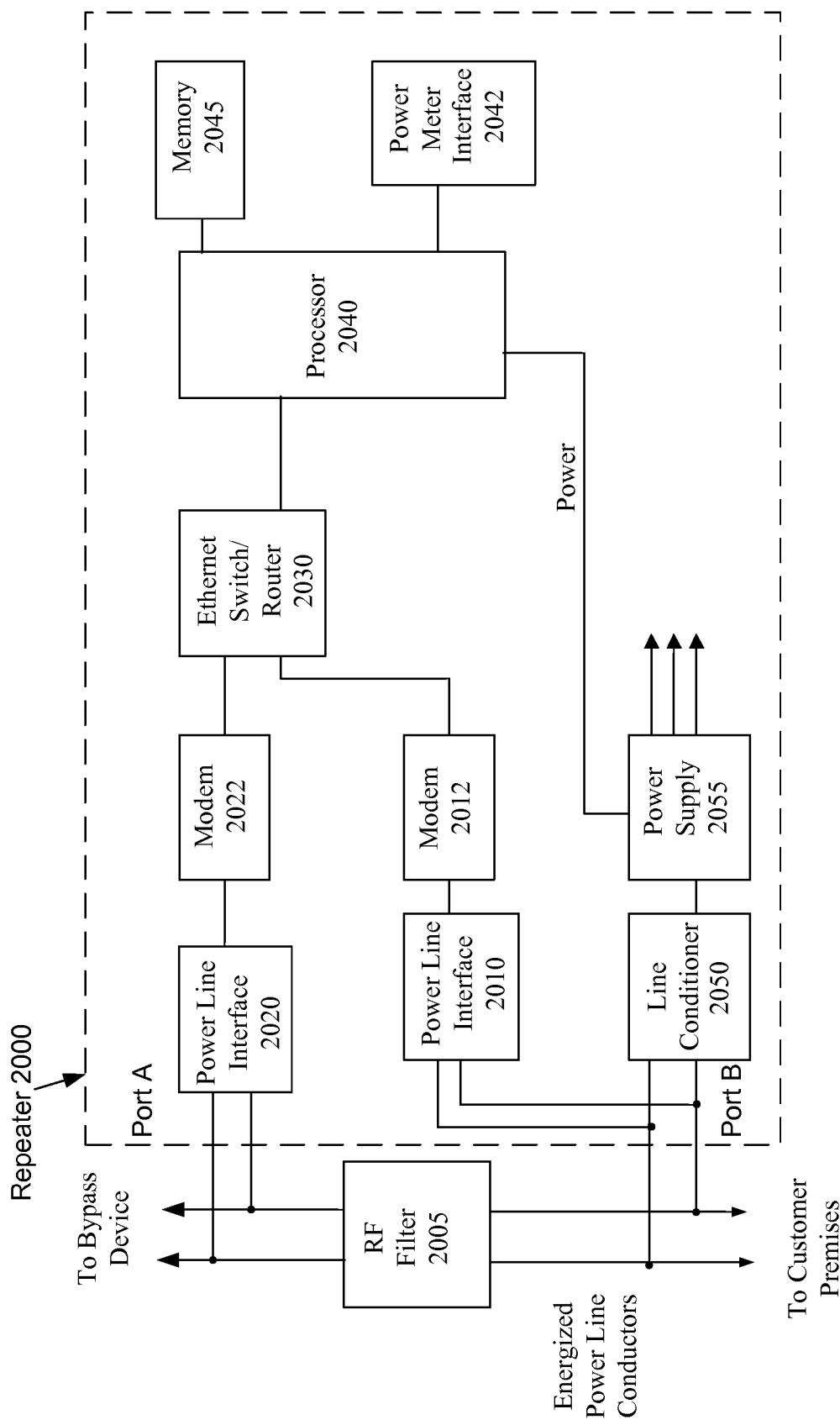
FIG. 5 is a block diagram of an example embodiment of a communication module, in accordance with the present invention.

FIG. 5 illustrates another example embodiment of communications module 2000, which includes filter 2005 for substantially impeding data signals traversing the LV power line conductors. Thus, filter 2005 provides isolation between the internal and external networks. This example embodiment functions in substantially the same manner as the embodiment of FIG. 4. However, data signals received from the external LV power line (e.g., from a bypass device 100) received at Port A typically will not be received at Port B because they will be attenuated by the filter 2005. Also, data signals received from the internal LV power line (e.g., from a user device) received at Port B typically will not be received at Port A because they will be attenuated by the filter 2005. In addition, the filter 2005 may prevent transmissions from one port from being received at the other port. Thus, the filter 2005 serves to substantially isolate modem 2012 from modem 2022. Thus, this embodiment need not use multiple encryption keys or different frequency bands to isolate the two networks. The RF filter 2005 may be implemented in any suitable manner such as in a separate meter collar or in the meter. Additionally, for many implementations the RF filter 2005 may not need to filter one hundred percent of the data signals. For example, even if the RF block only filters data signals received from other devices (does not sufficiently filter signals transmitted from modems 2012 and 2022) use of the RF block may improve communications (e.g., reduce latency) as both modems may be able to receive data signals simultaneously. Thus, addressing of data packets for only one of the two modems and/or encryption (as described herein) may be used in addition to the RF filter 2005.

In the embodiments disclosed, utility data such as power usage data, gas usage data, water usage data and electric voltage data, may be stored in memory of the module and transmitted to the network element 1) periodically, 2) upon receiving a request to transmit the data from the network element, 3) when memory in the device reaches a threshold percentage of capacity, 4) upon a triggering event such as an out of limit voltage measurement; and/or 4) at the occurrence of other events. The device may also store data from multiple meters (e.g., a gas, water, and power meter) and may be connected to such other non-power meters via a coaxial cable, a twisted pair, Ethernet cable, wirelessly, or other suitable medium. In some instances, localized noise may increase the noise floor at a device and degrade that device's ability to receive data. Thus, it may be desirable to only repeat data communications in one direction. Consequently, in some of the embodiments disclosed herein and others, it may not be necessary to repeat data in both directions. In other words, the device (or module 2000) may be configured to repeat only upstream data (data transmitted from the user device) or only downstream data (data transmitted to the user device). The module 2000 may be configure itself via channel testing and/or by receiving an appropriate command.

In still another embodiment, the implementation of FIG. 5 may be modified to connect the interface 2010 to the internal telecommunication network of the customer premises, such as a fiber network, coaxial cable network, Ethernet, or twisted pair network—instead of communicating the data over the internal power line network. In such an embodiment the internal power line network could be used as another local area network that is separate from the internal telecommunications network and the RF filter 2005 may provide isolation between the internal local area power line network and the external access network. The connection to the internal communications network may be via any suitable medium such as those described above. Finally, in still another embodiment modem 2012 may comprise a wireless modem (or wireless modem and router) and antenna for providing communications with a wireless network in the customer premises or wireless enabled user devices and other meter or utility devices (e.g., gas meters, water meters, other power meters, direct load control switch, and/or utility distribution automation equipment) via an IEEE 802.11 protocol. In addition to repeating user data, the present invention may be used to repeat utility data for other utility devices such gas meters, water meters, other power meters, direct load control switches, and utility distribution automation equipment. While some of the example embodiments disclosed herein employ a first and second encryption key, other embodiments may use three, four or more keys. For example, communications with each user device in the customer premises may employ a different key and/or communications with an internal or external low voltage repeater may employ a different key. In some embodiments, the processor described herein may be the processor of the meter itself, which shares task between controlling utility data collection and communication functions. Alternately, some embodiments may not employ a processor and simply have one or two modems that receive and transmit data when data is received.

Finally, the type of data signals communicated via the MV and LV power lines can be any suitable type of data signal. The type of signal modulation used can be any suitable signal modulation used in communications (Code Division Multiple Access (CDMA), Time Division Multiple Access (TDMA), Frequency Division Multiplex (FDM), Orthogonal Frequency Division Multiplex (OFDM), and the like). OFDM may be used for one or both of the LV and MV power lines, including HomePlug 1.0, HomePlug Turbo or HomePlug AV data signals. A modulation scheme producing a wideband signal such as CDMA or OFDM that is relatively flat in the spectral domain may be used to reduce radiated interference to other systems while still delivering high data communication rates. Thus, the example communication module described above may be used with frequency division multiplexed communication systems or time division multiplexed communication systems.

In addition, instead of using OFDM signals on the MV power line or LV power line, an alternate embodiment of a PLCS system may use ultra wideband signals to provide communications over the MV and/or LV power lines.

Some embodiments of the present invention includes a device and method for communicating user data and utility metrology data over a power line. In one embodiment, the method includes measuring a utility parameter to provide the utility data; storing the utility data in memory; transmitting the utility data over the power line; receiving first data via the power line from a first device; and transmitting the first data over the power line to a second device. In addition, the method may include receiving the first data and transmitting the first data with different encryption keys and also determining if the first data includes control data.

It is to be understood that the foregoing illustrative embodiments have been provided merely for the purpose of explanation and are in no way to be construed as limiting of the invention. Words used herein are words of description and illustration, rather than words of limitation. In addition, the advantages and objectives described herein may not be realized by each and every embodiment practicing the present invention. Further, although the invention has been described herein with reference to particular structure, materials and/or embodiments, the invention is not intended to be limited to the particulars disclosed herein. Rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention.

What is claimed is:

1. A method using a device to provide communications to a customer premises via an external low voltage power line, wherein the device is located external to the customer premises, comprising:
   receiving first data via the external low voltage power line;
   wireless transmitting the first data to a first wireless device disposed at the customer premises;
   wirelessly receiving second data from the first wireless device disposed at the customer premises;
   transmitting the second data over the external low voltage power line;
   operating in a first mode of operation in which repeating is enabled by performing the steps of:
      receiving second device data communicated over an internal low voltage power line of the customer premises from a second device at the customer premises; and
      transmitting the second device data over the external low voltage power line;
   operating in a second mode of operation in which repeating is disabled by performing the steps of:
      receiving power line data via the internal low voltage power line of the customer premises from the second device; and
      not transmitting the received power line data over a power line.

2. The method of claim 1, further comprising:
   receiving a command to disable repeating; and
   in response to receiving said command, operating in said second mode of operation.

3. The method of claim 1, wherein the transmitted second data is received at a communication device configured to communicate over a medium voltage (MV) power line.

4. The method of claim 1, wherein the first wireless device disposed at the customer premises comprises a user device.

5. The method of claim 1, further comprising:
   storing utility data in a memory; and
   transmitting the utility data over the external low voltage power line.

6. The method of claim 1, wherein the first wireless device disposed at the customer premises comprises a utility meter.

7. The method of claim 1, further comprising:
   determining whether the first data is to be repeated; and
   said wirelessly transmitting the first data is performed only if the first data is to be repeated.

8. The method of claim 7, further comprising determining whether the first data includes a command.

9. The method of claim 1, wherein further comprising determining if the first data includes control data.

10. The method of claim 1, further comprising routing the first data prior to said wirelessly transmitting the first data.

11. The method of claim 1, further comprising:
    receiving third data via the external low voltage power line; and
    wireless transmitting the third data to a second wireless device disposed at the customer premises.

12. The method of claim 1, wherein the first wireless device disposed at the customer premises comprises an in-home wireless network.

13. The method of claim 1, further comprising receiving a command that includes a request to transmit utility data.

14. The method of claim 1, further comprising determining a destination for the first data prior to said wirelessly transmitting the first data.

15. The method of claim 1, wherein an electric utility meter is associated with the customer premises and the device is co-located with the meter.

16. The method of claim 1, wherein an electric utility meter having a housing is associated with the customer premises and at least a portion of the device is disposed within the housing of the meter.

17. A device for providing communications over an external low voltage power line supplying power to a customer premises having an internal low voltage power line network, comprising:
    a first communication module configured to communicate over the external low voltage power line and the internal low voltage power line network of the customer premises;
    a second communication module in communication with said first communication module and configured to provide wireless communications for one or more remote devices;
    a processor in communication with said first communication module and said second communication module;
    said processor having first mode of operation in which said processor is operable to cause said first communication module to repeat data by re-transmitting data over a power line that is received via a power line;
    said processor having a second mode of operation in which said processor is operable to cause said first communication module to not repeat data that is received via a power line; and
    wherein said first and second communication modules and said processor form at least part of an assembly configured to be installed external to the customer premises and co-located with an electric utility meter.

18. The device of claim 17, wherein the external low voltage power line includes a first and second energized conductor and said first communication module is configured to be communicatively coupled to the first and the second energized conductors to differentially transmit data signals over the energized conductors.

19. The device of claim 17, wherein the first communication module is configured to communicate with a transformer bypass device via the external low voltage power line.

20. The device of claim 17, wherein the remote devices include a plurality of wireless user devices disposed within the customer premises.

21. The device of claim 17, wherein the electric utility meter has a housing and at least a portion of the assembly is disposed within the housing of the meter.

22. The device of claim 17, wherein the remote devices include a utility device.

23. The device of claim 17, wherein the remote devices include one or more wireless user devices disposed within the customer premises and one or more utility devices.

24. The device of claim 17,
wherein said first communication module is configured to decrypt data received via the external low voltage power line from a first device with a first key and to encrypt data transmitted over the internal low voltage power line network of the customer premises to a second device with a second key.

25. The device of claim 24, wherein said processor is configured to receive utility data from the electric utility meter and to cause said first communication module to transmit the utility data over the external low voltage power line.

26. The device of claim 17, further comprising a routing device in communication with said first communication module and said second communication module and forming part of the assembly.

27. The device of claim 17, wherein said second communication module comprises a wireless transceiver substantially compatible with an IEEE 802.11 protocol.

28. The device of claim 17, wherein said assembly comprises a circuit card configured to be attached to a utility meter.

29. A system for providing communications to a plurality of customer premises via one or more external low voltage power lines and each customer premises having an internal power line network, comprising:
a power line communication device comprising a first modem configured to communicate over the one or more external low voltage power lines;
a plurality of wireless interface devices, each located at, and external to, a respective one of the plurality of customer premises and wherein each wireless interface device includes:
a first communication module configured to communicate with said power line communication device via the external low voltage power line and configured to communicate over the internal power line network of a customer premises;
a second communication module in communication with said first communication module and configured to provide wireless communications for one or more remote devices within the respective customer premises;
each of said plurality of wireless interface devices having first mode of operation in which said first communication module is configured to repeat data by re-transmitting data over a power line that is received via either of the external low voltage power line and the internal power line network of the customer premises; and
each of said plurality of wireless interface devices having a second mode of operation in which said first communication module is configured to not repeat data that is received via a power line.

30. The system of claim 29, wherein said power line communication device further comprises a routing device in communication with said first modem.

31. The system of claim 29, wherein the external low voltage power lines include a first and second energized conductor and said first communication module is configured to be communicatively coupled to the first and the second energized conductors to differentially transmit data signals over the energized conductors.

32. The system of claim 29, wherein the one or more remote devices include a plurality of wireless user devices disposed within the respective customer premises.

33. The system of claim 29, wherein the power line communication device is configured to communicate over a medium voltage power line.

34. The system of claim 29, wherein said first communication module forms at least part of an assembly and said assembly comprises a circuit card configured to be electrically connected to a utility meter.

35. The system of claim 29, wherein said first and second communication modules form at least part of an assembly configured to be co-located with an electric utility meter.

36. The system of claim 35, wherein the electric utility meter has a housing and at least a portion of said assembly is disposed within the housing of the meter.

37. The system of claim 29, wherein the one or more remote devices include a utility device.

38. The system of claim 29, wherein the one or more remote devices include one or more wireless user devices and said second communication module is configured to provide wireless communications for one or more utility devices.

39. The system of claim 29, further comprising a processor in communication with said first communication module and said second communication module.

40. The system of claim 39, wherein said processor is configured to receive utility data from an electric utility meter and to cause said first communication module to transmit the utility data over the external low voltage power line.

41. The system of claim 29, further comprising a routing device in communication with said first communication module and said second communication module.

42. The system of claim 29, wherein said second communication module comprises a wireless transceiver substantially compatible with an IEEE 802.11 protocol.

43. The system of claim 29, further comprising a processor in communication with said first communication module and configured to cause said first communication module to transmit a notification in response to a determination that a voltage of the external low voltage power line is beyond a threshold voltage.

44. The device of claim 17, further comprising a processor in communication with said first communication module and configured to cause said first communication module to transmit a notification in response to a determination that a voltage of the external low voltage power line is beyond a threshold voltage.

45. The method of claim 1, further comprising:
determining that a voltage of the external low voltage power line is beyond a threshold voltage; and
transmitting a notification in response to said determining that a voltage of the external low voltage power line is beyond a threshold voltage.

46. The system of claim 29, wherein in said first mode of operation said first communication module is configured to decrypt data received via the external low voltage power line from the power line communication device with a first encryption key and to encrypt data transmitted over the internal power line network of the customer premises to a user device with a second encryption key.

47. The method of claim 1, further comprising in said first mode of operation:
  decrypting the received second device data with a first key; and
  encrypting the received second device data with a second key prior to said transmitting of the second device data.

48. The method of claim 1, wherein the second device data is received in a first frequency band and transmitted in a second frequency band different from the first frequency band.

* * * * *

UNITED STATES PATENT AND TRADEMARK OFFICE
CERTIFICATE OF CORRECTION

| | | |
|---|---|---|
| PATENT NO. | : 7,598,844 B2 | Page 1 of 1 |
| APPLICATION NO. | : 11/750058 | |
| DATED | : October 6, 2009 | |
| INVENTOR(S) | : Kevin F. Corcoran et al. | |

It is certified that error appears in the above-identified patent and that said Letters Patent is hereby corrected as shown below:

On the title page, in Item (75), under "Inventors", in column 1, line 3, delete "Middletown," and insert -- North Potomac, --, therefor.

On page 3, in Item (56), under "Other Publications", in column 2, line 6, delete "Eectric" and insert -- Electric --, therefor.

In column 5, line 8, delete "2005issued" and insert -- 2005, issued --, therefor.

Signed and Sealed this

Twenty-second Day of December, 2009

David J. Kappos
*Director of the United States Patent and Trademark Office*